United States Patent
Choi et al.

(10) Patent No.: US 9,185,044 B2
(45) Date of Patent: Nov. 10, 2015

(54) RATE REDUCTION FOR AN APPLICATION CONTROLLER

(71) Applicant: Hewlett-Packard Development Company, L.P., Houston, TX (US)

(72) Inventors: Byung Kyu Choi, Ypsilanti, MI (US); Luis Astudillo Pascual, Jr., Roseville, CA (US); Brian E. Krelle, Roseville, CA (US)

(73) Assignee: HEWLETT-PACKARD DEVELOPMENT COMPANY, L.P., Houston, TX (US)

( * ) Notice: Subject to any disclaimer, the term of this patent is extended or adjusted under 35 U.S.C. 154(b) by 344 days.

(21) Appl. No.: 13/804,062

(22) Filed: Mar. 14, 2013

(65) Prior Publication Data

US 2014/0280868 A1 Sep. 18, 2014

(51) Int. Cl.
- *G06F 15/173* (2006.01)
- *H04L 12/825* (2013.01)
- *G06F 1/00* (2006.01)
- *G06F 11/00* (2006.01)
- *H04L 12/26* (2006.01)

(52) U.S. Cl.
CPC ............... *H04L 47/263* (2013.01); *G06F 1/00* (2013.01); *H04L 43/0894* (2013.01)

(58) Field of Classification Search
CPC ...... H04L 47/263; H04L 43/0894; G06F 1/00
USPC .................... 709/224; 370/232, 236
See application file for complete search history.

(56) References Cited

U.S. PATENT DOCUMENTS

| 7,937,735 | B2* | 5/2011 | Avison ............................ 725/90 |
| 2002/0080780 | A1* | 6/2002 | McCormick et al. ......... 370/355 |
| 2003/0165150 | A1* | 9/2003 | Zimmermann et al. ...... 370/412 |
| 2006/0013128 | A1 | 1/2006 | Connor et al. |
| 2007/0171823 | A1 | 7/2007 | Hunt et al. |
| 2008/0159320 | A1 | 7/2008 | Kubota |
| 2010/0274893 | A1* | 10/2010 | Abdelal et al. ................ 709/224 |

FOREIGN PATENT DOCUMENTS

EP 1689207 8/2006

OTHER PUBLICATIONS

Unknown., "Configuring Control Plane Policing", Retrieved from http://www.cisco.com/en/US/docs/switches/datacenter/sw/4_1/nx-os/security/configuration/guide/sec_cppolicing.pdf, Feb. 2013, 24 pages.

* cited by examiner

*Primary Examiner* — Wen-Tai Lin
(74) *Attorney, Agent, or Firm* — Brooks, Cameron & Huebsch, PLLC (57) ABSTRACT

Rate reduction for an application controller is provided. Computing resources used by an application controller receiving an amount of traffic from a network device can be determined. A determination whether the computing resources used by the application controller are approaching a computing capacity of the application controller can be made. A message can be sent to the network device to reduce the amount of traffic sent to the application controller in response to a determination that the application controller is approaching the computing capacity. A reduced amount of traffic can be received from the network device. Incrementally increasing amounts of traffic can be received from the network device after receiving the reduced amount of traffic from the network device.

15 Claims, 3 Drawing Sheets

RATE REDUCTION FOR AN APPLICATION CONTROLLER

BACKGROUND

Computing networks can include a series of network devices interconnected by communication paths, which can communicate a unit of data (e.g., packets, frames) through the computing network. For example, computing networks can contain network devices, which can communicate the unit of data through the network based on information associated with the unit of data (e.g., a destination address, quality of service, security data). In an example, network devices can include routers, switches, hubs, and computing devices such as servers, desktop PCs, laptops, workstations, mobile devices and peripheral devices, e.g., printers, facsimile devices, and scanners, networked together across wired and/or wireless local and/or wide area network (LANs/WANs).

In an example, the network devices can communicate the unit of data to an application controller, which can contain intelligence regarding how to handle the unit of data. For instance, the unit of data can be communicated based on a quality of service associated with the unit of data and/or security data associated with the unit of data. For example, a security function can be performed on the unit of data (e.g., firewall) based on the security data. The unit of data may or may not come back to the network device to continue to be forwarded, based on an action taken by the application controller.

DETAILED DESCRIPTION

An application controller can provide an application function for an application. In an example, the application controller can be a sentinel that provides security for traffic (e.g., unit of data) associated with the application. The application controller can contain intelligence about a network and can make a decision based on that intelligence to provide the application function.

For example, for traffic that has been communicated to the application controller, the decision can be made based on a level of a quality of service associated with the traffic or it can be based on a particular security function (e.g., firewall). In order to utilize the application controller, a network device can redirect the traffic from a destination associated with the traffic to the application controller. The application controller can then make a decision on the actions applicable to the traffic based on the intelligence contained in the application controller. As discussed herein, traffic may or may not be returned to the network device to be forwarded.

For the application controller to make a decision regarding the traffic, the traffic can be forwarded to the application controller so it can be analyzed. However, this architecture can create a traffic bottleneck at the application controller because the network devices may not have a knowledge of the workload of the application controller and a computing capacity of the application controller may be reduced such that the application controller can only process a given amount of traffic per unit of time. In addition, the application controller may serve multiple network devices. As such, it may be difficult to reduce the traffic sent from the network device to the application controller by imposing a specific bandwidth amount to each network device, individually. For example, imposing a specific bandwidth amount at each network device with the application controller may result in an increased cost associated with use of computing resources by the application controller.

A challenge of providing control over traffic between a plurality of sources (e.g., network devices) and one destination (e.g., application controller) can exist. Some previous methods can determine an amount of traffic sent between each network device and the application controller and monitor whether a backlog of traffic exists. In an example, a decision can be made to introduce an action to satisfy a constraint. The decision can include calculating an amount by which to reduce traffic sent to the application controller and reducing the amount of traffic sent to the application controller by the calculated amount (e.g., action) in response to a determination that a backlog of traffic exists at the application controller (e.g., constraint). Each network device can maintain the amount of traffic being sent according to the particular calculated amount. However, increased computing costs can be associated with calculating the particular amount of traffic to send from each network device and maintaining the particular amount of traffic being sent from each network device. In addition, increased computing costs can be associated with determining an amount of traffic sent between each network device and the application controller and monitoring whether a backlog of traffic exists.

In addition, these previous methods can have an increased complexity because the traffic sent from each network device to the application controller is dynamic, resulting in frequent changes to the amount of traffic being sent. As a result, the monitor collects information on the amount of traffic being sent from the network device to the application controller as well as the computing resources being used by the application controller at periodic measurement intervals. Complexity can be associated with determining how long the measurement interval should be. For example, the measurement interval should be long enough to capture the flow pattern of traffic, while being short enough to follow the fluctuations of the pattern of traffic. In addition, the balancer has to be aware of the amount of traffic being sent from the network device to the application controller, further resulting in an increased use of computing resources.

These previous methods can result in an increased use of computing resources because the dynamic patterns of traffic being sent from the network device to the application controller are determined to ensure that computing resources used by the application controller are maintained at levels below the computing capacity of the application controller. As such, deterministic approaches such as these do not provide a solution that matches the dynamic patterns of traffic flow between the network devices and the application controller. In addition, deterministic approaches such as these can have increased costs associated with use of computing resources.

To help address the limitations associated with controlling the dynamic flow of traffic between the network devices and the application controller as well as computing resources used by the application controller, systems, methods, and machine-readable and executable instructions are provided for rate reduction for an application controller. Rate reduction can include determining computing resources used by an application controller receiving an amount of traffic from a network device. Rate reduction can include determining whether the computing resources used by the application controller are approaching a computing capacity of the application controller. Rate reduction can include sending a message to the network device to reduce the amount of traffic sent to the application controller in response to a determination that the application controller is approaching the computing capacity. Rate reduction can include receiving a reduced amount of traffic from the network device. Rate reduction can include receiving incrementally increasing amounts of traffic sent from the network device after receiving the reduced amount of traffic from the network device.

In the present disclosure, reference is made to the accompanying drawings that form a part hereof, and in which is shown by way of illustration how a number of examples of the disclosure can be practiced. These examples are described in sufficient detail to enable those of ordinary skill in the art to practice the examples of this disclosure, and it is to be understood that other examples can be used and that process, electrical, and/or structural changes can be made without departing from the scope of the present disclosure.

The figures herein follow a numbering convention in which the first digit corresponds to the drawing figure number and the remaining digits identify an element or component in the drawing. Elements shown in the various figures herein can be added, exchanged, and/or eliminated so as to provide a number of additional examples of the present disclosure. In addition, the proportion and the relative scale of the elements provided in the figures are intended to illustrate the examples of the present disclosure, and should not be taken in a limiting sense.

Figure 1:
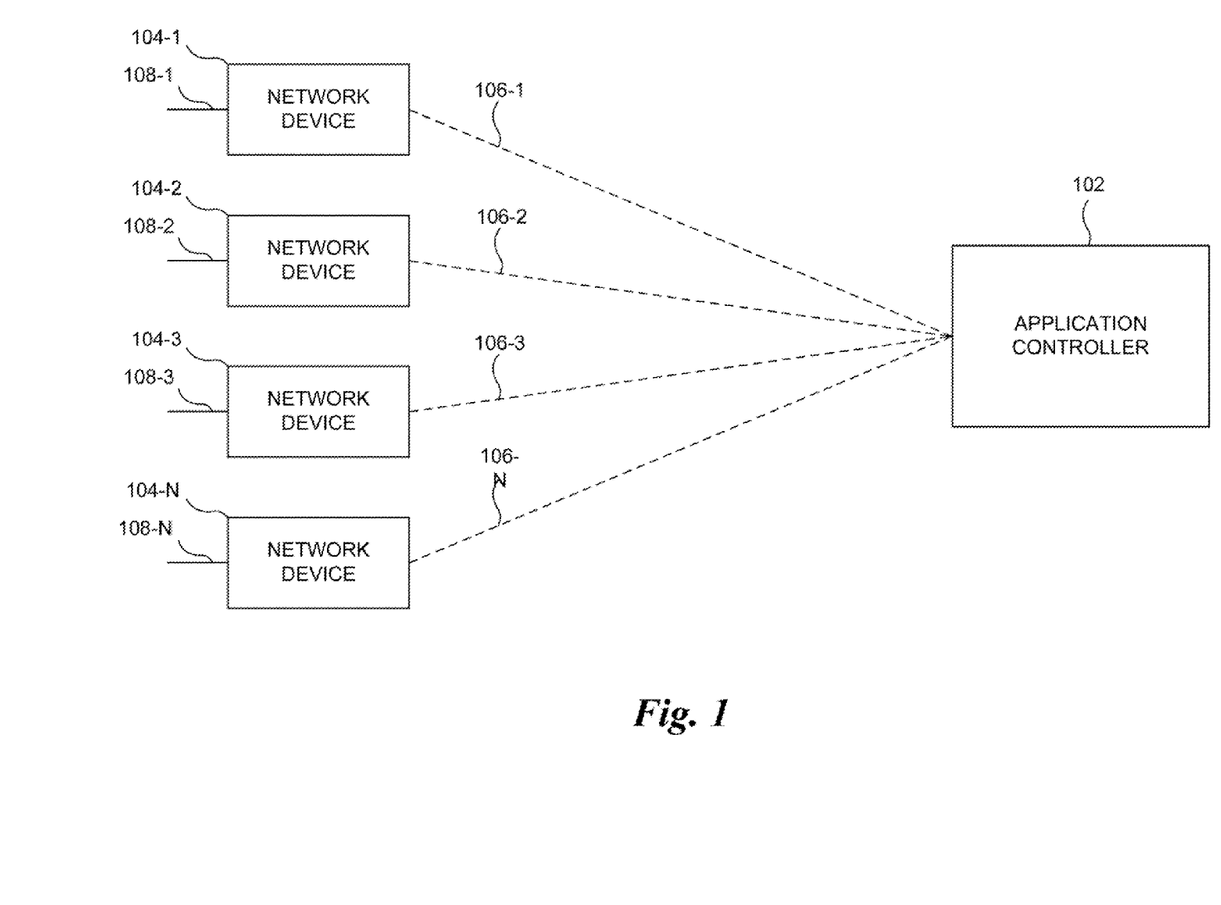
FIG. 1 is an example of a computing system for rate reduction for an application controller according to the present disclosure.

FIG. 1 is an example of a computing system for rate reduction for an application controller according to the present disclosure. The system can include a plurality of network devices 104-1, 104-2, 104-3, 104-N, hereinafter collectively referred to as network devices 104. A number of the plurality of network devices 104 can be represented as N and each network device can be represented as $D_i$, where i is the i-th network device. The network devices 104 can be routers, switches, hubs, and computing devices such as servers, desktop PCs, laptops, workstations, mobile devices and peripheral devices, e.g., printers, facsimile devices, and scanners, networked together across wired and/or wireless local and/or wide area network (LANs/WANs), for example, which can receive input traffic 108-1, 108-2, 108-3, 108-N, hereinafter collectively referred to as input traffic 108. Input traffic 108 can be represented by $T_i$. The network devices 104 can send traffic 106-1, 106-2, 106-3, 106-N, hereinafter collectively referred to as traffic 106, to an application controller 102 at a sending rate represented by $R_i$. In an example, $R_i$ can be the sending rate by $D_i$ to the application controller 102, the sending rate by the i-th network device. The application controller 102 can provide control over an application and/or can contain intelligence about a network. In an example, the application can be an application that determines whether a particular web site is safe to visit.

As such, the network devices 104 can reroute input traffic 108 (e.g., unit of data) associated with the web site to the application controller 102, which can make a decision regarding a security function like firewall, for example. Depending on an action taken by the application controller 102, the traffic 106 may or may not be sent back to the network devices 104 for forwarding to a destination listed in a header associated with the unit of data (e.g., packet header). For instance, the unit of data may be dropped due to a security reason or altered for quality of service purposes.

In an example, as an amount of input traffic 108 is redirected by the network devices 104 to the application controller 102, computing resources used by the application controller 102 can increase as a result of the increased amount of traffic 106 received from the plurality of network devices 104. For example, computing resources associated with the application controller 102 can be used to process the traffic 106.

The computing resources used by the application controller 102 can include central processing unit (CPU) utilization. In an example, computing resources used by the application controller 102 can be measured in terms of input or output of a unit of data. For instance, computing resources can be measured in terms of a database activity that can include an input or output of an amount of traffic to or from the database. The computing resources used by the application controller 102 can include computing resources used for processing the received traffic 106, which can be represented as $C_{app}$, and/or computing resources used for performing operations of the application controller 102, which can be represented as $C_{other}$, and may be hidden from the network devices 104. In an example, computing resources used by the application controller 102 for processing the received traffic 106 can be given by the following equation:

$$C_{app} = \Sigma_{i=1}^{N} C_i$$

where $C_i$ is representative of the computing resources used by the application controller 102 to process the traffic 106 sent at the sending rate $R_i$.

In an example, the application controller 102 can possess a finite amount of computing capacity. As traffic 106 increases, the available computing resources associated with the application controller 102 can decrease until an overall computing capacity, which can be represented as $C_{overall}$, of the application controller 102 is used and limited computing capacity remains. As discussed herein, this scenario can create a bottleneck at the application controller 102 because once the overall computing capacity of the application controller 102 is reached, the application controller 102 cannot process increased amounts of traffic 106 any faster. In addition, the network devices 104 may not have a knowledge of the workload of the application controller 102 and may keep sending traffic 106 to the application controller 102, even though a backlog of traffic 106 is waiting to be processed by the application controller 102.

As such, it may be desirable to maintain a condition associated with the application controller 102 where a sum of the computing resources used by the application controller 102 and the computing resources used for performing operations of the application controller 102 is less than or equal to the overall computing capacity of the application controller 102. For example, such a condition can be expressed as:

$$C_{app} + C_{other} \leq C_{overall}$$

In an example, the above condition can be maintained by reducing the rate at which traffic is sent to the application controller 102.

However, without proper controls in place, this condition may not be maintained. As discussed herein, some previous methods have employed deterministic approaches, which attempt to monitor the dynamic patterns of traffic flow between the network devices 104 and the application controller 102. Some of these approaches can establish a communication channel between the network devices 104 and the application controller 102, such that the application controller 102 can communicate with the network devices 104 to indicate that a backlog of traffic 106 exists. In an example, establishment of a communication channel can include storing contact information associated with each of the network devices 104 and/or application controller 102. However, establishment of a communication channel can use computing resources associated with the application controller 102 when storing contact information associated with the network devices 104 and/or the network devices 104 when storing contact information associated with the application controller 102.

Examples of the present disclosure can provide for control of the rate at which traffic 106 is sent by the network devices 104 without use of a deterministic approach or storing contact information associated with network devices 104 and the application controller 102, which can result in less use of computing resources. In addition, examples of the present disclosure can communicate traffic through use of hardware instead of through use of software, which can be less costly with regards to use of computing resources. For instance, computing resources may not be expended on executing computer executable instructions. In an example, the application controller can include a network chip including logic, embedded in an application specific integrated circuit (ASIC), and a network port for the device for receiving and transmitting traffic therefrom.

In an example, the present disclosure can provide for control over the rate at which traffic 106 is sent by the network devices 104 through use of a monitor and/or trigger. For instance, the monitor can be a monitor that can be a built in CPU utilization monitor of one or more operating systems running the network devices 104 and/or application controller 102, which can report the CPU utilization rate at periodic time intervals (e.g., 1 second intervals). In an example, the monitor can operate on the application controller 102 side of the network. The monitor may not follow the dynamic values associated with $T_i$, $R_i$, $C_{app}$, and/or $C_{other}$. In an example, the trigger can observe the CPU utilization rate and determine when the CPU utilization rate approaches a computing capacity. In an example, the trigger can determine when the CPU utilization rate associated with the application controller 102 approaches a threshold computing capacity. Upon determining that the CPU utilization rate approaches the threshold computing capacity, the trigger can communicate to a balancer, which can operate on the application controller 102 side of the network, that the rate is higher than the threshold. In an example, the trigger may be the same entity and/or a different entity than the monitor.

In an example of the present disclosure, the balancer can be an entity that can implement a decrement process to send a message to the plurality of network devices 104 to reduce the amount of traffic 106 sent to the application controller 102 in response to the determination that the CPU utilization rate is approaching the computing capacity. In an example, the balancer can send a message to the plurality of network devices 104 to reduce the amount of traffic 106 sent to the application controller 102 in response to the determination that the application controller 102 is approaching the computing capacity. The balancer may not specify a new value for $R_i$, the sending rate of the traffic 106.

The message can be a multicast message that is sent to the plurality of network devices 104. In an example, the multicast message can be a broadcast. By sending a multicast message to the plurality of network devices 104, contact information associated with each individual network device 104 may not be maintained by the application controller 102 in order for the application controller to communicate with the network devices 104. As such, computing resources may not be utilized to establish such a communication channel.

Alternatively, the message can be a unicast message that is sent to each of the plurality of network devices 104 individually. In an example, when sending a unicast message to each of the plurality of network devices 104 individually, contact information associated with each individual network device 104 may be maintained by the application controller 102 in order for the application controller 102 to communicate with the network devices 104. As such, additional computing resources may be utilized to establish such a communication channel versus those utilized when sending a multicast message.

In an example, a safety factor, represented by $\Delta$, can be employed to prevent the computing resources used by the application controller 102 from reaching the threshold computing capacity. For example, a condition can be employed such that the sum of the computing resources used by the application controller 102, the computing resources used for performing operations of the application controller 102, and the safety factor is less than or equal to the overall computing capacity of the application controller 102. For example, such a condition can be expressed as:

$$\Delta + C_{app} + C_{other} \leq C_{overall}$$

An example of pseudo code, which can implement the decrement process and generate the message when this condition is threatened follows:

```
Require: C_max, C_app, C_other
Ensure: Generate message to each D_i when the condition
        C_app + C_other ≤ C_overall is threatened
1:    for all expiration of P do
2:        if Δ + C_app + C_other ≤ C_overall then
3:            for all i do
4:                Send message to D_i
5:            end for
6:        else
7:            return
8:        end if
9:    end for
``` where P is a time period for performing tasks associated with reducing $R_i$.

In an example, the application controller 102 can receive a reduced amount of traffic 106 from the plurality of network devices 104 in response to the network devices 104 receiving the message. For instance, the message can include instructions to reduce the amount of traffic 106 sent to the application controller 102. In an example, the amount by which the traffic 106 is reduced can be between 10 percent and 90 percent. For instance, the amount of traffic 106 sent from the plurality of network devices 104 can be reduced by a value between 10 percent and 90 percent. In an example, the amount of traffic 106 sent from the plurality of network devices 104 can be reduced by half. In an example, the particular amount at which the traffic 106 is reduced can be an amount that can ensure that a backlog of traffic 106 does not form at the application controller 102. In addition, the particular amount at which the traffic 106 is reduced can be an amount that still allows for traffic 106 to be processed by the application controller 102. For example, traffic 106 should not be reduced by an amount that does not utilize a majority of computing resources allocated to the application controller 102 for processing traffic 106.

In an example, the amount of traffic 106 sent to the application controller 102 can be reduced by a constant amount and/or a variable amount. For instance, the network device 104 can be configured to automatically reduce the amount of traffic 106 by a fixed amount. Benefits of reducing the amount of traffic 106 by a fixed amount can include a reduction in use of computing resources, for example. However, some efficiency can be lost as a result of reducing the amount of traffic 106 by a fixed amount because the application controller 102 may be able to process more traffic 106 than the reduced amount of traffic 106. Alternatively, the application controller 102 can be configured to reduce the amount of traffic 106 by a variable amount, which can result in an increase of computing resources used by the application controller 102. However, efficiency associated with processing traffic 106 can be increased because the application controller 102 can vary the reduction in the amount of traffic 106 in order to utilize a majority of computing resources allocated to the application controller 102 to process traffic 106.

Examples of the present disclosure can include an enforcer, which can operate on the network device 104 side of the network. In an example, the enforcer can be a set of distributed entities at each network device 104. The enforcer can use fewer computing resources than previous approaches, in an example. For instance, the enforcer can direct each network device 104 to reduce the amount of traffic 106 sent to the application controller 102 by an amount (e.g., half) in response to receipt of the message to reduce the amount of traffic 106 sent to the application controller 102. As such, the enforcer does may not ensure that the amount of traffic 106 sent from each network device 104 is maintained at a particular amount. In contrast, the enforcer can direct each network device 104 to reduce the amount of traffic 106 by half, without knowing an actual amount of traffic 106 being sent by each network device 104. As a result, less computing resources can be used by the enforcer in contrast to previous approaches.

In an example, the amount of traffic 106 sent to the application controller 102 can be reduced by a proportional amount between each of the plurality of network devices 104. For instance, as discussed herein, the amount of traffic 106 sent from each network device 104 can be reduced by a same amount (e.g., half). As such, each network device 104 can be treated equally and a rate at which traffic 106 is sent from a particular network device 104 can be proportionately decreased or increased versus rates at which traffic 106 is sent from other network devices 104.

In an example of the present disclosure, the application controller 102 can receive incrementally increasing amounts of traffic 106 sent from the plurality of network devices 104 after receiving the reduced amount of traffic 106 from the plurality of network devices 104. The amount by which the traffic 106 incrementally increases, which can be represented by $\delta_i$, can be determined via a increment process by dividing a sending rate of the traffic 106 by a maximum of either a constant value, which can be defined by a network administrator, for example, or the plurality of network devices 104.

In an example, if the number of network devices 104 can be small (e.g., fewer than four), dividing the sending rate of the traffic 106 by the number of network devices 104 can result in incremental increases to the sending rate that can be too large. For instance, if there are two network devices 104, the increment can be half of the sending rate. As such, the increment process can divide the sending rate by a maximum of the constant value or the number of network devices 104. In an example, the constant value can be set by a network administrator to a value of four to ensure that the increment can be of a particular size. For instance, if two network devices 104 exist, the maximum of the constant value and the number of network devices 104 can be taken, which is four. The sending rate of each network device 104 can then be divided by four to determine the increment by which the sending rate of each network device is increased.

In an example, the increment process can be represented as follows:

$$\delta_i = R_i / \max(\text{constValue}, N)$$

where $\delta_i$ is the amount by which the traffic 106 incrementally increases, $R_i$ is the sending rate of traffic 106 from $D_i$ to the application controller 102, constValue is a value that can be set by a network administrator, and N is the number of network devices. As discussed herein, the max function will return the maximum of the constantValue and N.

An example of a pseudo code that can implement the increment process follows:

```
Require: R_i, T_i, C_max, C_app, C_other
Ensure: Maintain C_app + C_other ≤ C_overall, while increasing R_i if R_i ≤ T_i
1:   for all expiration of P do
2:       for all i do
3:           if R_i < T_i then
4:               R_i ← R_i + δ_i
5:           else
6:               return
7:           end if
8:       end for
9:   end for
```

In an example of the present disclosure, the incrementally increasing amounts of traffic can be received until an additional message is sent to the plurality of network devices to reduce the amount of traffic sent to the application controller. In an example, the condition:

$$\Delta + C_{app} + G_{other} \leq C_{overall}$$

can be monitored and if the condition is threatened, the decrement process can be implemented. Accordingly, the rate at which traffic 106 is sent by the plurality of network devices 104 can be continually adjusted such that a backlog of traffic 106 to be processed by the application controller 102 does not exist.

In an example, the increment process can be implemented by one of the plurality of network devices 104. The network devices 104 can be capable of recognizing the message sent to the network devices 104 to reduce the amount of traffic 106 sent by the network devices 104 to the application controller 102. The network devices 104 can be capable of calculating $R_i$, $T_i$, and $\delta_i$. The network devices 104 can be capable of running the enforcer to direct each network device 104 to reduce the amount of traffic 106 sent to the application controller 102 by an amount. The network devices 104 can be capable of updating $R_i$ incrementally according to $R_i + \delta_i$ when the condition $R_i < T_i$ is met.

In an example, the increment process can be implemented by the application controller 102. In an example, the application controller 102 can be capable of generating the message to send to the network device 104 to reduce the amount of traffic 106 sent by the plurality of network devices 104 to the application controller 102. The application controller 102 can be capable of calculating $R_i$ and $\delta_i$. The application controller 102 can be capable of generating an update message that includes $R_i$ and $\delta_i$ and sending the update message to the plurality of network devices 104. In an example, this message can be a separate message from the message to reduce the amount of traffic 106 sent by the plurality of network devices 104. Alternatively, this message can be in a same message as the message to reduce the amount of traffic 106 sent by the plurality of network devices 104. The network device 104 can be capable of updating $R_i$ with incrementally according to $R_i + \delta_i$.

Figure 2:
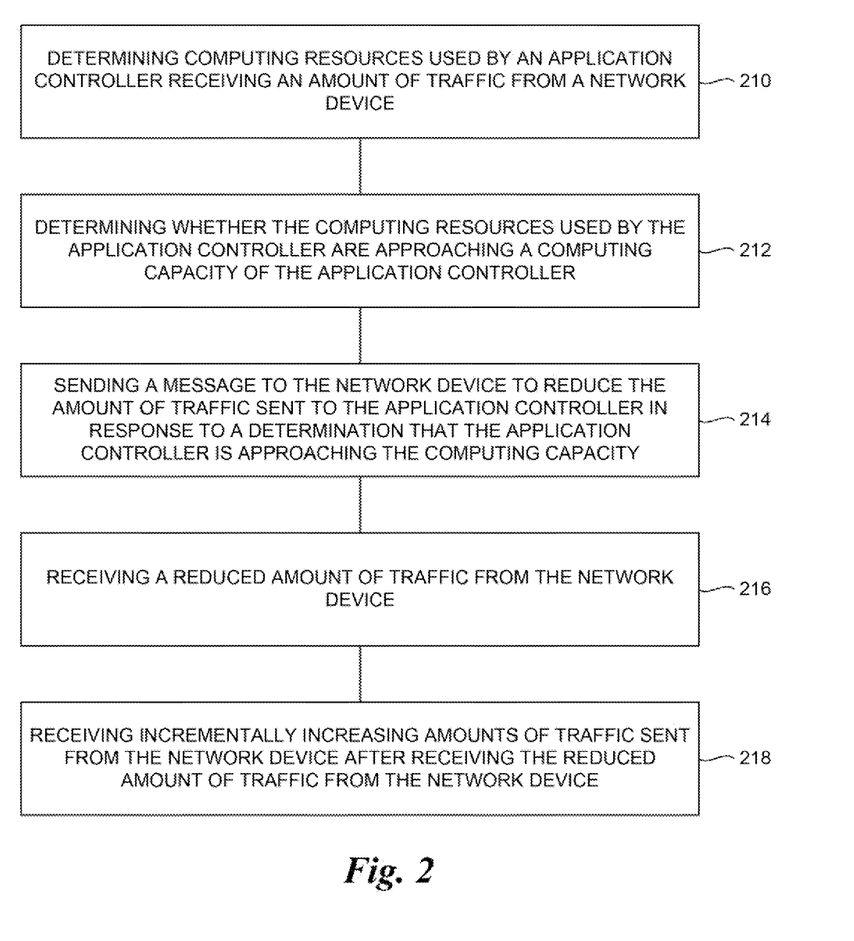
FIG. 2 is a flow chart illustrating an example of a method for rate reduction for an application controller according to the present disclosure.

FIG. 2 is a flow chart illustrating an example of a method for rate reduction for an application controller according to the present disclosure. In an example of the present disclosure, the method can include determining 210 computing resources used by an application controller receiving an amount of traffic from a network device. In an example, the application controller can receive the amount of traffic from a plurality of network devices. The computing resources used by the application controller can include computing resources used for processing the received traffic and/or computing resources used for performing operations of the application controller.

In an example of the present disclosure, the method can include determining 212 whether the computing resources used by the application controller are approaching a computing capacity of the application controller. In an example, the computing capacity can be an overall computing capacity of the application controller. As discussed herein, the computing resources used by the application controller can increase as an increased amount of traffic is processed by the application controller. As the overall computing capacity is reached due to the amount of traffic processed by the application controller, a backlog of traffic can form at the application controller, in an example.

In an example of the present disclosure, the method can include sending 214 a message to the network device to reduce the amount of traffic sent to the application controller in response to a determination that the application controller is approaching the computing capacity. In an example, the message can be a multicast message that can be sent to the plurality of network devices to reduce the amount of traffic sent to the application controller. As such, contact information associated with each individual network device may not be maintained by the application controller in order for the application controller to communicate with the network devices. As such, computing resources may not be utilized to establish such a communication channel.

In an example, the application controller can instruct the network device to reduce the amount of traffic based on a determination that the application controller is approaching the computing capacity. However, the application controller may not be apprised of the amount of traffic sent by the network device to the application controller. For example, a rate of traffic sent by the network device to the application controller may not be communicated to the application controller. By monitoring the computing capacity associated with the application controller rather than a rate of traffic sent by the network device, fewer computing resources may be used to determine when to instruct the network devices to reduce the amount of traffic sent to the application controller.

In an example, the method can include reducing the amount of traffic received by the application controller by half in response to the determination that that the application controller is approaching the computing capacity. In an example, upon reduction of the amount sent by the network device and received by the application controller, the computing resources used by the application controller can be reduced and a backlog of traffic at the application controller can be avoided.

In an example of the present disclosure, the method can include receiving 216 a reduced amount of traffic from the network device. In an example, as discussed herein, reducing the amount of traffic received by the application controller can result in less computing resources being used by the application controller and/or a reduction or elimination of a backlog of traffic at the application controller.

In an example of the present disclosure, the method can include receiving 218 incrementally increasing amounts of traffic sent from the network device after receiving the reduced amount of traffic from the network device. In an example, the amount of traffic can be incrementally increased by the network device. In an example, incrementally increasing the amount of traffic sent to the application controller from the network device can prevent a backlog of traffic forming at the application controller.

In an example, each incrementally increasing amount of traffic can be smaller than the amount by which the traffic is reduced. As such, the amount of traffic received by the application controller can be slowly stepped up to ensure a backlog of traffic does not form at the application controller and/or eliminate a backlog that has formed at the application controller.

In an example, the amount of traffic received by the application controller from the network device can be increased until an additional message is sent to the network device to reduce the amount of traffic sent to the application controller. For instance, as the amount of traffic sent to the application controller is incrementally increased, the computing resources used by the application controller can approach the computing capacity of the application controller, which can prompt the application controller to send the message to the network device to reduce the amount of traffic sent to the application controller.

Figure 3:
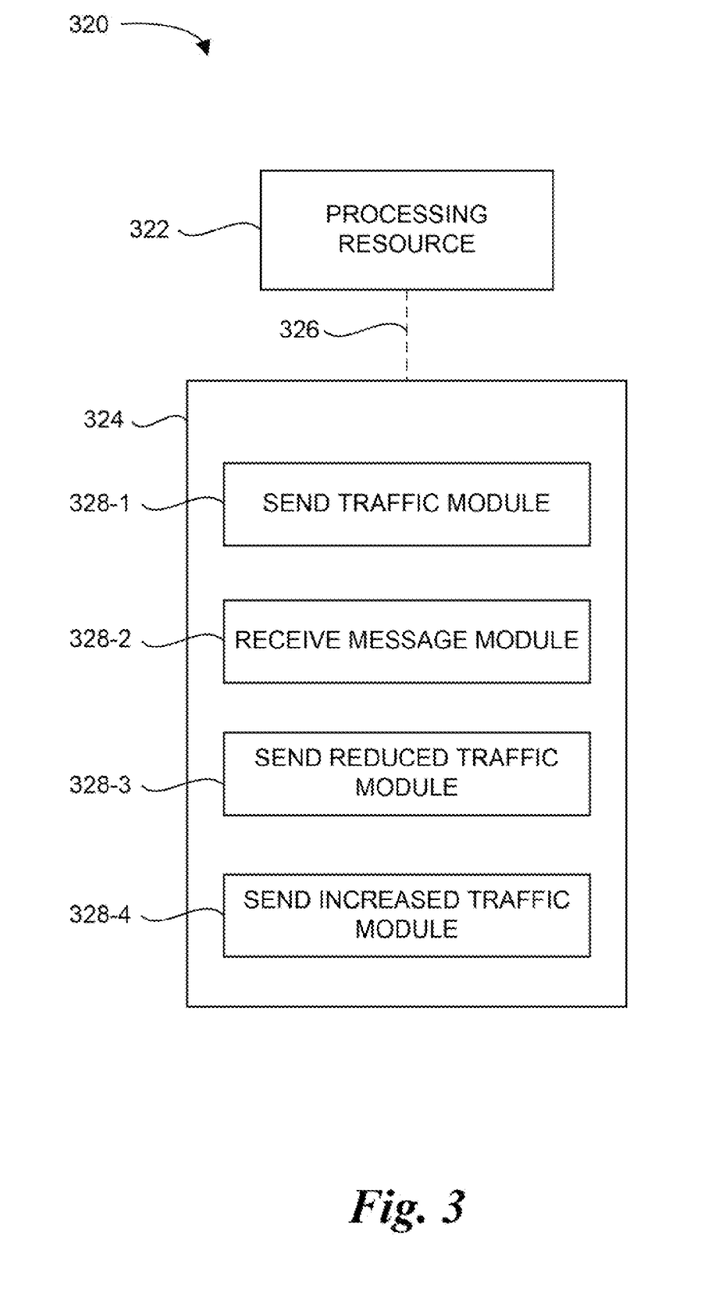
FIG. 3 illustrates a block diagram of an example of a computer-readable medium in communication with processing resources of a computing device according to the present disclosure.

FIG. 3 illustrates a block diagram of an example of a computer-readable medium in communication with processing resources of a computing device according to the present disclosure. The computing device 320 can utilize software, hardware, firmware, and/or logic to perform a number of functions. The computing device 320 can be a combination of hardware and program instructions configured to perform a number of functions (e.g., actions). The hardware, for example, can include a number of processing resources 322 and a number of memory resources 324, such as a machine-readable medium (MRM) or other memory resources 324. The memory resources 324 can be internal and/or external to the computing device 320 (e.g., the computing device 320 can include internal memory resources and have access to external memory resources). The program instructions (e.g., machine-readable instructions (MRI)) can include instructions stored on the MRM to implement a particular function (e.g., rate reduction for an application controller). The set of MRI can be executable by one or more of the processing resources 322. The memory resources 324 can be coupled to the computing device 320 in a wired and/or wireless manner. For example, the memory resources 324 can be an internal memory, a portable memory, a portable disk, and/or a memory associated with another resource (e.g., enabling MRI to be transferred and/or executed across a network such as the Internet).

Memory resources 324 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of machine-readable media.

The processing resources 322 can be coupled to the memory resources 324 via a communication path 326. The communication path 326 can be local or remote to the computing device 320. Examples of a local communication path 326 can include an electronic bus internal to a machine, where the memory resources 324 are in communication with the processing resources 322 via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof. The communication path 326 can be such that the memory resources 324 are remote from the processing resources 322, such as in a network connection between the memory resources 324 and the processing resources 322. That is, the communication path 326 can be a network connection. Examples of such a network connection can include local area network (LAN), wide area network (WAN), personal area network (PAN), and the Internet, among others.

As shown in FIG. 3, the MRI stored in the memory resources 324 can be segmented into a number of modules 328-1, 328-2, 328-3, 328-4 that when executed by the processing resources 322 can perform a number of functions. As used herein, a module includes a set of instructions included to perform a particular task or action. The number of modules 328-1, 328-2, 328-3, 328-4 can be sub-modules of other modules. For example, the send message module 328-2 can be a sub-module of the determine computing resources module 328-1 and/or the send message module 328-2 and display data field module determine computing resources module 328-1 can be contained within a single module. Furthermore, the number of modules 328-1, 328-2, 328-3, 328-4 can comprise individual modules separate and distinct from one another. Examples are not limited to the specific modules 328-1, 328-2, 328-3, 328-4 illustrated in FIG. 3.

The send traffic module 328-1 can comprise MRI that can be executed by the processing resource 322 to send an amount of traffic from a plurality of network devices to an application controller for processing the traffic. In an example, computing resources can be used by the application controller when processing the amount of traffic. In an example, the computing resources used by the application controller can be determined. As discussed herein, as an amount of traffic processed by the application controller increases, computing resources used by the application controller can increase.

The receive message module 328-2 can comprise MRI that can be executed by the processing resource 322 to receive a message from the application controller with the plurality of network devices to reduce the amount of traffic sent to the application controller in response to a determination that the application controller is approaching a computing capacity. As discussed herein, the computing capacity can be an overall computing capacity of the application controller. As the overall computing capacity is reached due to the amount of traffic processed by the application controller, a backlog of traffic can form at the application controller, in an example.

The send reduced traffic module 328-3 can comprise MRI that can be executed by the processing resource 322 to send a reduced amount of traffic from the plurality of network devices to the application controller. In an example, the network device can send a reduced amount of traffic to the application controller in response to receiving the message to reduce the amount of traffic sent. As such, less traffic can be sent to the application controller and computing resources used by the application controller to process the traffic can be reduced.

The send increased traffic module 328-4 can comprise MRI that can be executed by the processing resource 322 to send incrementally increasing amounts of traffic from the plurality of network devices to the application controller after sending the reduced amount of traffic from the plurality of network devices. In an example, the incrementally increasing amounts of traffic are sent to the application controller until an additional message is received by the plurality of network devices to reduce the amount of traffic sent to the application controller. In an example, the amount of traffic can be incrementally increased until computing resources used by the application controller approach a computing capacity, which can trigger a response to send a message to the plurality of network devices to reduce the amount of traffic sent to the application controller.

In an example, MRI can be executed by the processing resource 322 to determine an incremental value to increase the amount of traffic sent by each of the plurality of network devices. As discussed herein, the incremental value can be determined by dividing the amount of traffic sent by each of the plurality of network devices by the total number of network devices when the total number of network devices exceeds a threshold. Alternatively, the incremental value can be determined by dividing the amount of traffic sent by each of the plurality of network devices by a constant value when the total number of network devices is below the threshold. As discussed herein, dividing the amount of traffic sent by each of the plurality of network devices by the constant value can prevent the incremental increase in the amount of traffic sent from being too large.

Alternatively, the incremental value can be determined based on the received message from the application controller. In an example, the application controller can include a number of incremental increases to make before the amount of traffic sent by the network device is the same as an amount of traffic sent prior to receiving the message to reduce the amount of traffic sent to the application controller. For instance, if a network device was sending 1,000 units of data per second before it received the message from the application controller, it could reduce its rate by 500 units of data per second (e.g., one-half) and could perform 10 incremental increases based on instructions included in the message. For example, the network device could increase the amount of traffic to 1,000 units of data per second after making 10 incremental increases. As such, the network device can determine the incremental value by dividing the amount by which traffic has been reduced (e.g., 500 units of data) by the number of incremental increases (e.g., 10), to determine the incremental value by which traffic is increased (e.g., 50 units of data per interval).

In an example, a time period between sending the incrementally increasing amounts of traffic can be determined based on the received message. In an example, the received message can include instructions supplied by the application controller to increase the amount of traffic from the reduced amount to the amount sent prior to receipt of the message over a period of time. As such, the period of time can be divided by the number of incremental increases to make. For example, a time period of 30 seconds can be provided in the message, which can be divided by the number of incremental increases to make (e.g., 10), giving a 3 second time period between sending the incrementally increasing amounts of traffic.

In an example, an amount of input traffic received by each of the plurality of network devices can exceed an amount of traffic sent from each of the plurality of network devices. For instance, the rate at which traffic is sent by the network devices can be reduced, which can cause a backlog of input traffic at an input side of each of the plurality of network devices. As such, the input traffic received can be treated according to a defined policy to prevent a backlog of the input traffic.

In an example, the defined policy can include dropping an amount of the input traffic received by each of the plurality of network devices. The amount of input traffic dropped can be equivalent to an amount by which the input traffic received by each of the plurality of network devices exceeds the amount of traffic sent from each of the plurality of network devices. For example, by dropping an amount of input traffic by an amount equivalent to that by which the amount of input traffic exceeds the amount of traffic sent from each of the plurality of network devices, the amount of input traffic can be equivalent to the amount of traffic sent thereby eliminating a potential backlog.

Alternatively, the defined policy can include forwarding of an amount of input traffic. In an example, forwarding of an amount of input traffic can include forwarding an amount of the input traffic without redirecting the amount of input traffic to the application controller. For instance, the input traffic can be sent to its intended destination according to address information included with the traffic (e.g., packet header). As such, forwarding of the input traffic can prevent a backlog of traffic forming on the input side of the plurality of network devices.

As used herein, "a" or "a number of" something can refer to one or more such things. For example, "a number of widgets" can refer to one or more widgets.

The above specification, examples and data provide a description of the method and applications, and use of the system and method of the present disclosure. Since many examples can be made without departing from the spirit and scope of the system and method of the present disclosure, this specification merely sets forth some of the many possible embodiment configurations and implementations.

What is claimed:

1. A method, comprising the following computer-implemented acts:
   determining computing resources used by an application controller receiving an amount of traffic from a plurality of network devices communicating traffic to the application controller;
   determining whether the computing resources used by the application controller are approaching a computing capacity of the application controller;
   sending a message to the network device to reduce the amount of traffic sent to the application controller in response to a determination that the application controller is approaching the computing capacity;
   receiving a reduced amount of traffic from the network device; and
   receiving incrementally increasing amounts of traffic sent from the network device after receiving the reduced amount of traffic from the network device, and wherein the incrementally increasing amounts of traffic vary as a function of respective incrementally increasing sending rates of traffic of each of the plurality of network devices communicating traffic to the application controller divided by a total number of the plurality of network devices.

2. The method of claim 1, wherein the method includes increasing the amount of traffic received by the application controller from the network device until an additional message is sent to the network device to reduce the amount of traffic sent to the application controller.

3. The method of claim 1, wherein the method includes:
   receiving the amount of traffic from a plurality of network devices; and
   sending a multicast message to the plurality of network devices to reduce the amount of traffic sent to the application controller.

4. The method of claim 3, wherein the method includes proportionately reducing the amount of traffic received by the application controller from each of the plurality of network devices, in response to the determination that the application controller is approaching the computing capacity.

5. The method of claim 1, wherein the computing resources used by the application controller include computing resources used for processing the received traffic and computing resources used for performing operations of the application controller.

6. The method of claim 1, wherein each incrementally increasing amount of traffic is smaller than the amount by which the traffic is reduced.

7. The method of claim 1, wherein a rate of traffic sent by the network device to the application controller is not communicated to the application controller.

8. A non-transitory computer-readable medium storing a set of instructions executable by a processor to cause a computer to:
   send an amount of traffic from a plurality of network devices to an application controller for processing the traffic;
   receive a message from the application controller with the plurality of network devices to reduce the amount of traffic sent to the application controller in response to a determination that the application controller is approaching a computing capacity;
   send a reduced amount of traffic from the plurality of network devices to the application controller; and
   send incrementally increasing amounts of traffic from the plurality of network devices to the application controller after sending the reduced amount of traffic from the plurality of network devices, wherein the incrementally increasing amounts of traffic are sent until an additional message is received by the plurality of network devices to reduce the amount of traffic sent to the application controller, and wherein the incrementally increasing amounts of traffic vary as a function of respective incrementally increasing sending rates of traffic of each of the plurality of network devices communicating traffic to the application controller divided by a total number of the plurality of network devices communicating traffic to the application controller when the total number of the network devices communicating traffic to the application controller exceeds a threshold number of network devices communicating traffic to the application controller.

9. The medium of claim 8, comprising instructions executable by the processor to determine an incremental value to increase the amount of traffic sent by each of the plurality of network devices.

10. The medium of claim 9, comprising instructions executable by the processor to determine a time period between sending the incrementally increasing amounts of traffic based on the received message.

11. The medium of claim 9, wherein the instructions executable by the processor include instructions to determine the incremental value based on the received message.

12. The medium of claim 8, comprising instructions executable by the processor to treat an amount of input traffic received by each of the plurality of network devices according to a defined policy when the amount of input traffic received by each of the plurality of network devices exceeds the amount of traffic sent from each of the plurality of network devices.

13. An application controller, comprising:
a network chip including logic, embedded in an application specific integrated circuit, and a network port for the application controller for receiving and transmitting traffic therefrom, wherein the network chip is to:
send a multicast message to a plurality of network devices communicating traffic to the application controller to reduce a total amount of traffic sent to the application controller by the plurality of network devices in response to a determination that computing resources used by the application controller are approaching a computing capacity; and
a processing resource in communication with a memory resource, wherein the memory resource includes a set of instructions and wherein the processing resource is designed to carry out the set of instructions to:
receive a reduced total amount of traffic from the plurality of network devices; and
receive incrementally increasing amounts of traffic sent from the plurality of network devices after receiving the reduced total amount of traffic from the plurality of network devices, wherein the incrementally increasing amounts of traffic are received until an additional message is sent to the plurality of network devices to reduce the total amount of traffic sent to the application controller, and wherein the incrementally increasing amounts of traffic vary as a function of a respective incrementally increasing sending rates of traffic of each of the plurality of network devices communicating traffic to the application controller divided by a total number of the plurality of network devices communicating traffic to the application controller when the total number of the network devices communicating traffic to the application controller exceeds a threshold number of network devices communicating traffic to the application controller.

14. The application controller of claim 13, wherein:
the computing resources used by the application controller receiving the total amount of traffic from the plurality of network devices include central processing unit (CPU) utilization; and
the CPU utilization is monitored by a CPU utilization monitor of an operating system running the network device and the application controller.

15. The application controller of claim 13, wherein the multicast message is sent to the plurality of network devices when computing resources used by the application controller approach an overall computing capacity minus a safety factor.

* * * * *